(12) United States Patent
Gasparroni et al.

(10) Patent No.: US 8,064,395 B2
(45) Date of Patent: Nov. 22, 2011

(54) DATA TRANSMISSION

(75) Inventors: Max Gasparroni, Newbury (GB); Christopher David Pudney, Newbury (GB); Marco Stura, Ivrea (IT)

(73) Assignee: Vodafone Group PLC, Newbury, Berkshire (GB)

( * ) Notice: Subject to any disclaimer, the term of this patent is extended or adjusted under 35 U.S.C. 154(b) by 906 days.

(21) Appl. No.: 12/052,684

(22) Filed: Mar. 20, 2008

(65) Prior Publication Data

US 2009/0016282 A1    Jan. 15, 2009

(30) Foreign Application Priority Data

Mar. 26, 2007  (GB) .................................... 0705787
Apr. 18, 2007  (GB) .................................... 0707503
Sep. 17, 2007  (GB) .................................... 0718088

(51) Int. Cl.
    *H04W 4/00*    (2009.01)

(52) U.S. Cl. ........................................ 370/329

(58) Field of Classification Search .................. 370/329, 370/328, 330, 349, 341, 338, 331; 455/445, 455/456.2; 709/224
See application file for complete search history.

(56) References Cited

U.S. PATENT DOCUMENTS

| 7,068,645 | B1 | 6/2006 | Phadnis et al. |
| 7,466,652 | B2 * | 12/2008 | Lau et al. ................... 370/230.1 |
| 7,913,261 | B2 * | 3/2011 | Mitchell et al. ............... 719/310 |
| 2005/0030889 | A1 | 2/2005 | Tao |

FOREIGN PATENT DOCUMENTS

| WO | 01/39526 | 5/2001 |
| WO | 2004/036849 A2 | 4/2004 |
| WO | 2007/051960 | 5/2007 |
| WO | 2007/130281 | 11/2007 |
| WO | WO 2008/021360 | * 2/2008 |

OTHER PUBLICATIONS

British Examination Report issued on Apr. 6, 2011 in corresponding British Patent Application No. GB0718088.8.

* cited by examiner

*Primary Examiner* — Chi Pham
*Assistant Examiner* — Alexander Boakye
(74) *Attorney, Agent, or Firm* — Workman Nydegger

(57) ABSTRACT

In a mobile or cellular telecommunications network a single tunnel between nodes 7, 11, 15 and 19 of the network is established to transmit data on a plurality of bearers. Each bearer transmits data relating to a particular service. The respective bearers may be identified by identification data. The identification data may indicate the priority of the data in the particular bearer. The identification data may indicate the DiffServ Service Class, DSSC, as defined in RFC 4594.

16 Claims, 2 Drawing Sheets

DATA TRANSMISSION

The present invention relates to a method of transmitting data on a plurality of bearers in a cellular or mobile telecommunications network. The present invention also relates to a telecommunications network adapted to implement such a method.

To ensure competitiveness of the 3GPP systems in a time frame of the next 10 years and beyond, a Long-Term Evolution (LTE) of the 3GPP access technology is being studied. The Evolved packet System (EPS), previously known as Systems Architecture Evolution (SAE), is described in 3GPP TS 23.401, and TS 23.402 which are fully incorporated herein by reference. Important tasks of such long term evolution include reduced latency, improved system capability, reduced cost per bit, and higher user data rates. Increasing the economy of scale through complexity reduction and re-use of mechanisms and protocols already defined in the fixed Internet is an important element to achieve cost savings.

Key elements of an EPS/LTE network, and its operation, will now briefly be described with reference to FIG. 1.

Each eNode B 15 or base station corresponds to a respective set of cells of its cellular or mobile telecommunications network and receives calls/data from and transmits calls/data to a mobile terminal in that set of cells by wireless radio communication in the packet switched domain. Such a subscriber's mobile terminal (or User Equipment-UE) is shown at 11. The mobile terminal may be a handheld mobile telephone, a personal digital assistance (PDA), a laptop computer equipped with a datacard, or a laptop computer with an embedded chipset containing the UE's functionality.

The RRC signalling with the mobile terminal 11 terminates at the eNode B 15, the eNode B comprising the Radio Access Network (RAN) of the EPS/LTE network. The eNode B 15 performs the functions of both the Node B and a large part of the RNC of a 3G/UMTS network. The network core of the EPS/LTE network includes Packet Data Network Gateway (PDN GW) 7, serving gateway (Serving GW) 19 and also a Mobility Management Entity (MME) (not shown). A plurality of PDN-GWs are usually provided, although only one is shown.

Communications between the mobile terminal 11 and the network core can be considered to be split into a control plane and a user plane. The control plane performs the required signaling, and includes the relevant application protocol and the signaling bearer for transporting the application protocol messages. Among other things, the application protocol is used for setting up the radio access bearer in the radio network layer. The user plane transmits data traffic and includes data streams and data bearers for the data streams. The data streams are characterized by one or more frame protocols specified for that interface. Generally speaking, the user plane carries data for use by a receiving terminal—such as data that allows a voice or picture to be reproduced—and the control plane controls how the data is transmitted.

Figure 1:
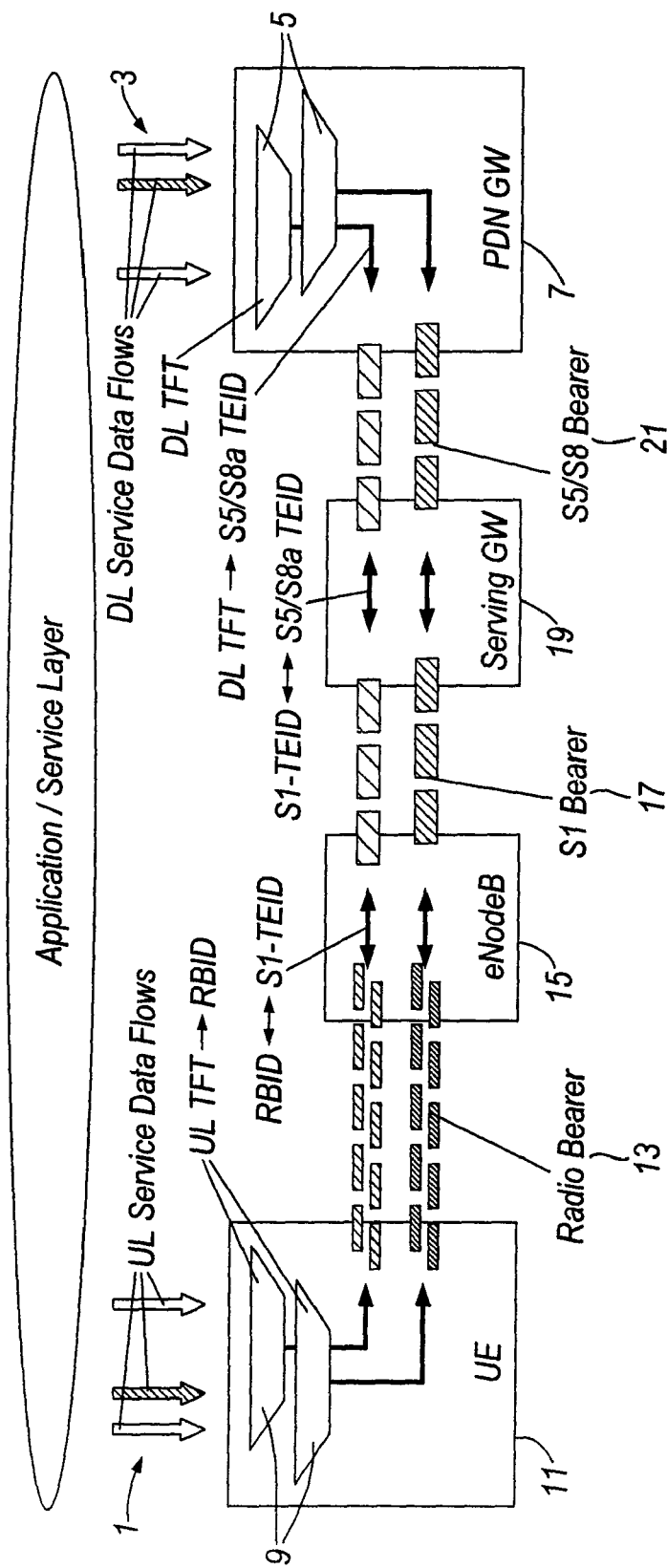

The QoS (Quality of Service) framework currently agreed in 3GPP is described in 3GPP TS 23.401 (which is fully incorporated herein by reference) and is shown in FIG. 1. In this framework:—

Service Data Flows (SDF) 1,3 represent an IP flow characterising a particular application.

Downlink (DL) Traffic Flow Template (DL TFT) is a set of downlink packet filters. DL TFT 5 in the PDN GW 7 binds service data flows (identified by packet filters) to EPS bearers in downlink direction. Multiple SDFs can be multiplexed onto the same EPS bearer by including multiple downlink packet filters in the DL TFT 5.

Uplink (UL) Traffic Flow Template (UL TFT) is a set of uplink packet filters. UL TFT 9 in the mobile terminal (UE) 11 binds service data flows (identified by packet filters) to EPS bearers in uplink direction. Multiple SDFs can be multiplexed onto the same EPS bearer by including multiple uplink packet filters in the UL TFT 9.

A radio bearer 13 transports packets of an EPS bearer between the UE 11 and the eNode B 15 (and vice versa). There is a 1:1 mapping between radio bearer and EPS bearer.

S1 bearer 17 transports the packets of EPS bearers between the Serving GW 19 and eNode B 15.

S5/S8a bearer 21 transports the packets of EPS bearers between the Serving GW 19 and the PDN GW 7.

GPRS Tunneling Protocol-User Plane (GTP-U) has been chosen as tunneling protocol over the S1 and S5/S8a interfaces 17,21 (for the 3GPP EPS architecture for GPRS enhancement option). The current specifications of the GTP protocol (TS 29.060), defines the TEID (Tunnel Endpoint Identifier) which is used to identify a single transport tunnel. The QoS framework specifications (TS 23.107) define a bearer approach for existing 2G and 3G systems where each IP flow with different QoS requirements is mapped to a different UMTS bearer service identified by a PDP Context. TS 23.107 (FIG. 1) specifies how a UMTS bearer service is in turn provided by sub-layers such as Radio Access Bearer Service (in turn split into Radio Bearer Service and RAN Access Bearer Service) and CN Bearer Service. Each Bearer Service (e.g. TS 25.413 for RAN) specifies how to perform a 1:1 association between a bearer and a transport tunnel identified by a GTP TEID (TS 29.060)

As a result, a GTP Tunnel Endpoint Identifier (TEID) is used to identify a particular QoS flow of a particular UE 11. This paradigm is not efficient because typically a UE may want to establish several EPS bearers to have different QoS treatments for different types of services being accessed. This means that each QoS flow for a given UE requires a different tunnel. This is a source of major inefficiencies in terms of delay and signalling load in setting up (and tearing down) a new tunnel every time a new bearer has to be established (or released). In particular, the TEID has to be negotiated and communicated at both ends of the tunnel. This inefficiency is emphasised during handover, where all the tunnels related to a UE have to be torn down from the old base station and established on the new base station.

As shown in FIG. 1, the GTP TEID used over S1 can be different from the GTP TEID used over S5/S8a, and the mapping between the two is maintained by the Serving GW 19.

A second problem with the current paradigm is the lack of QoS differentiation of these GTP tunnels from a transport point of view. Even though a different TEID is assigned for each QoS flow, the TEID to QoS mapping is only known at the end nodes (e.g. eNB 15, Serving GW 19 and PDN GW 7). For this reason the transport network carrying the traffic of S1 and S5/S8a interfaces 17,21 cannot prioritise the traffic based on the TEID. As a result, the transport networks (including both core and backhaul sections) have to be over-dimensioned to cope with busy hours demands because no quality of service differentiation is made on the IP packets encapsulating the different GTP tunnels.

In one aspect, the present invention provides a method of transmitting data on a plurality of bearers in a cellular or mobile telecommunications network, the method including establishing a single tunnel between nodes of the telecommunications network and transmitting the data on said plurality of bearers in said tunnel.

In the embodiment, each bearer transmits data relating to a particular service or QoS flow.

In the embodiment identification data is provided to identify the respective bearers within the tunnel. The identification data also indicates the priority of the data (i.e. QoS) in each bearer. The identification data may be indicative of a DiffServ Service Class, DSSC, as defined in RFC 4594. This provides a convenient mechanism, already known in the fixed IP world, for transmitting priority or QoS data.

In the embodiment, in a first mechanism, the identification data is transmitted in a tunnel end point identifier, TEID. The identification data comprises one part of the TEID, another part of the TEID being common to all bearers in the said tunnel. The common part of the TEID identifies the tunnel. Advantageously, this allows only one ID (the common part) to be negotiated between two tunnel end points (for example, a serving gateway and an eNB).

In the embodiment, in a second mechanism, the identification data is transmitted as a separate field from a tunnel end point identifier, TEID. The TEID is common to all bearers in the tunnel. The TEID identifies the tunnel. Only one ID (the TEID) is negotiated between the tunnel end points.

The mobile or the cellular telecommunications network may be a EPS/LTE network, and the nodes may comprise a mobile terminal (UE), eNode B, Serving Gateway and/or Packet Data Network Gateway. The invention is also applicable to other types of cellular or mobile telecommunications networks for transmitting data between nodes corresponding to these nodes.

In the embodiment only one tunnel is established between a mobile terminal and the network, the data being transmitted on a plurality of bearers in the tunnel.

The present invention also relates to a mobile or cellular telecommunications network as defined in the claims.

For a better understanding of the present invention, an embodiments will now be described, by way of example only, with reference to the accompanying drawings, in which:—

Figure 2:
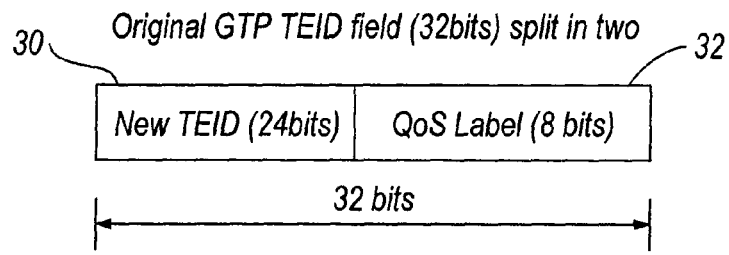
Figure 3:
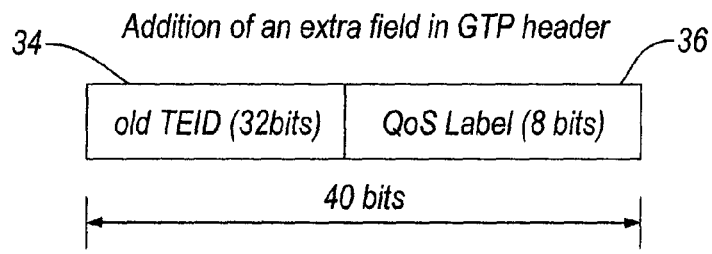
Figure 4:
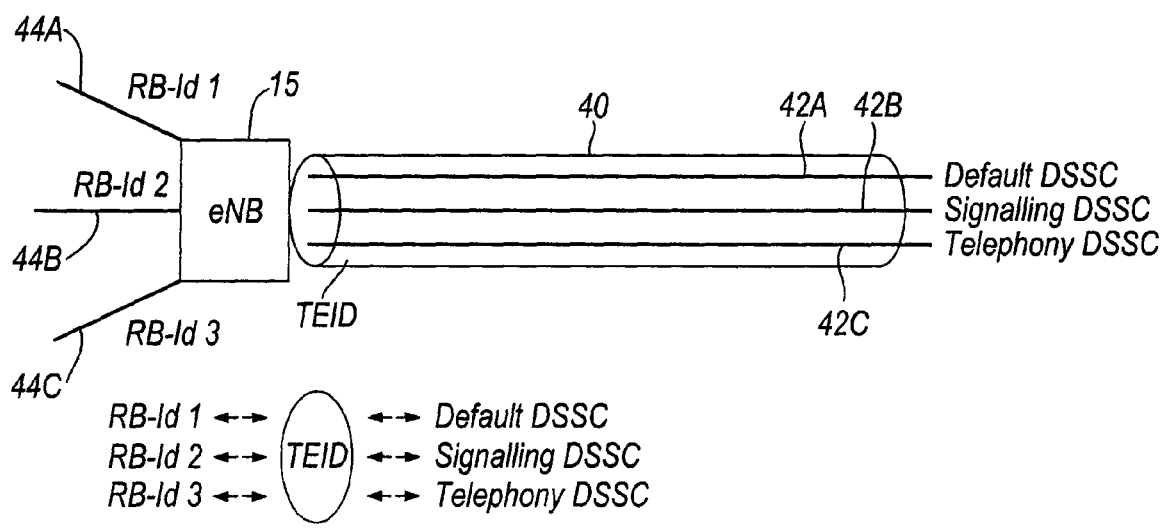

FIG. 1 shows schematically the elements of a telecommunications network including a mobile telecommunication terminal; and FIGS. 2 and 3 show alternative arrangements for indicating the QoS of a particular bearer; and FIG. 4 shows schematically a single tunnel for a plurality of bearers.

In the drawings like elements are generally designated with the same reference numeral.

The embodiment now to be described addresses the two problems mentioned above by
 1. Reducing the bearer setup delay and simplifying the bearer management framework, and
 2. Simplifying the EPS QoS model by leveraging as much as possible the existing IP QoS framework to be deployed by mobile operators regardless of EPS A single user plane mobility tunnel is used over the S1 and S5/S8a interfaces 17,21 (GTP based) for each UE 11. With one single user plane mobility tunnel for all the possible flows (here considered as EPS bearers), there is a necessity to distinguish between the different flows within the same tunnel, in order to maintain the end-to-end EPS bearer concept.

Most of the mobile network operators are undergoing initiatives to converge their transport network from Asynchronous Transfer Mode (ATM) and Time Division Multiplex (TDM) towards a unified IP-based infrastructure. These initiatives typically cover both the core network (including roaming connectivity) and backhaul networks from the core network to the eNB 15. These IP networks are "DiffServ" capable. DiffServ or Differentiated Services is described in RFC 2474 (which is fully incorporated herein by reference), and specifies a simple, scalable and coarse-grained mechanism for classifying, managing network traffic and providing QoS guarantees on modern IP networks. The QoS marking specified in the Type of Service (ToS) field of an IP header can be mapped to the QoS mechanism used in the specific transport network, such as Multi-Protocol Label Switching (MPLS). However, the tunneling mechanisms currently agreed in 3GPP do not mandate any mapping of the type of service transported by each tunnel (identified in the form of Labels) to the outer IP header in terms of Diffserv Code Point (DSCP) values.

The embodiment proposes two mechanisms, that can be used either in isolation or in conjunction.

According to the first mechanism, the GPRS TEID is modified. Conventionally, the GPRS TEID space is an unstructured 32 bit field in the GTP header. According to the first mechanism, the TEID space is split into two fragments, as shown in FIG. 2. The first fragment (TEID-UE) 30 is used to identify the UE 11 and comprises 24 bits. The second fragment (TEID-QF) 32 identifies the QoS flow (which represents an EPS bearer in the case of 3GPP EPS described in TS 23.401, or a PDP Context in the case of previous 3GPP packet switched systems described in TS 23.060) for the UE 11 and comprises 8 bits. However, the first fragment may instead be 26 bits and the second fragment 6 bits.

The new format of the TEID allows to have only one tunnel per UE 11. This tunnel is identified by the first 24/26 bit fragment (TEID-UE) of the GTP TEID field. The last 8/6 bit fragment (TEID-QF) of that field identifies the EPS bearer. Importantly, only one ID (which will be the first 24/26 bit fragment (TEID-UE) per UE 11 was to be negotiated between the Serving GW 19 and the eNB 15 (or between any two tunnel endpoints). In the prior art versions of GTP discussed above, each bearer had to negotiated a new TEID. In the first mechanism there are as many TEIDs per UE 11 as the number of EPS bearers established by the UE 11, but all these TEIDs have the first 24 bits (or 26 bits) in common.

As specified in TS 23.401, each EPS bearer is associated with two QoS parameters called Label and Allocation and Retention Priority (ARP).

A Label is a scalar that is used as a reference to access node-specific parameters that control bearer level packet forwarding treatment (e.g. scheduling weights, admission thresholds, queue management thresholds, link layer protocol configuration, etc.). Together with the Allocation and Retention Priority, a Label identifies uniquely the EPS bearer of a UE 11. The Label in 3GPP EPS/LTE context is not different and does not carry different semantic from DiffServ Service Classes (DSSC) defined in RFC 4594.

For this reason the DiffServ Service Classes can be used for the second fragment 32 to identify a particular EPS/LTE bearer associated with a UE 11. The DSSC may be indicated by setting the second fragment to have a DSCP value corresponding to the DSSC, as shown in the table below.

| Service Class Name - DSSC | Application Examples | DSCP Name | DSCP Value |
|---|---|---|---|
| Network Control | Network routing | CS6 | 110000 |
| Telephony | IP Telephony bearer (VoIP) | EF | 101110 |
| Signalling | IP Telephony signalling | CS5 | 101000 |
| Multimedia Conferencing | H.323/V2 video | AF41, AF42 | 100010, 100100 |
|  | Conferencing (adaptive) | AF43 | 100110 |

-continued

| Service Class Name - DSSC | Application Examples | DSCP Name | DSCP Value |
|---|---|---|---|
| Real-time Interactive | Video conferencing & interactive gaming | CS4 | 100000 |
| Multimedia Streaming | Streaming video & audio on demand | AF31, AF32, AF33 | 011010, 011100, 011110 |
| Broadcast Video | Broadcast TV & live events | CS3 | 011000 |
| Low Latency Data | Client/server transactions | AF21, AF22 | 010010, 010100 |
|  | Web-based ordering | AF23 | 010110 |
| OAM | OAM&P | CS2 | 010000 |
| High Throughput Data | Store & forward applications | AF11, AF12, AF13 | 001010, 001100, 001110 |
| Standard | Undifferentiated applications | DF, (CS0) | 000000 |
| Low Priority Data | Any low that has no BW assurance | CS1 | 001000 |

Where CS = Class Selector,
DF = Default Behaviour (e.g. Best Effort),
AF = Assured Forwarding, and
EF = Expedited Forwarding.

The table below shows DiffServ Service Class characteristics

| Service Class Name- DSSC | Tolerance to Traffic Characteristics | Loss | Delay | Jitter |
|---|---|---|---|---|
| Network Control | Variable size packets, mostly inelastic short messages, but traffic can also burst (BGP) | Low | Low | Yes |
| Telephony | Fixed size small packets, constant emission rate, inelastic and low rate flows | Very Low | Very Low | Very Low |
| Signalling | Variable size packets, some what bursty short lived flows | Low | Low | Yes |
| Multimedia Conferencing | Variable size packets, constant transmit interval, rate adaptive, reacts to loss | Low to Medium | Very Low | Low |
| Real-time Interactive | RTP/UDP streams, inelastic, mostly variable rate | Low | Very Low | Low |
| Multimedia Streaming | Variable size packets elastic with variable rate | Low to Medium | Yes | Medium |
| Broadcast Video | Constant and variable rate, inelastic, non bursty flows | Very Low | Medium | Low |
| Low Latency Data | Variable rate, bursty short lived elastic flows | Low | Low to Medium | Yes |
| OAM | Variable size packets, elastic & inelastic flows | Low | Medium | Yes |
| High Throughput Data | Variable rate, bursty long lived elastic flows | Low to High | Medium | Yes |
| Standard | A bit of everything |  | Not Specified |  |
| Low Priority Data | Non real-time and elastic | High | High | Yes |

The usage of DSSC in the second fragment enables both the identification of each particular flow (EPS bearer) as well as QoS enforcement on a transport layer whenever an IP-based DiffServ capable transport network is deployed. The latter is provided because the DSSC used in the second fragment can be copied (without requiring any mapping) to the outer IP header Diffserv Code Point (DSCP) field.

When UE 11 attaches to the network, the S-GW 19 and eNB 15 each allocate a TEID-UE and a value for TEID-QF that identifies a default QoS profile. As a result, and as in the current GPRS system, a pair of 32 bit TEIDs are allocated.

Any downlink packets that are received by the eNode B 15 with the UE 11's TEID-UE, but with an unallocated TEID-QF, can be handled with the default QoS (or by some other predetermined rule). The S-GW 19 can apply similar handling to uplink packets.

By grouping all of the QoS flows for UE 11 under the same TEID-UE, then in the Attach, Service Request, and other procedures, the eNodeB 15 can allocate its TEID-UE at a very early stage in the procedure. Then (using the treatment indicated in the preceding paragraph), user data flow can start earlier than in the current procedures described in TS 23.401 (fully incorporated herein by reference). In addition, the early assignment of TEID avoids complexity at the S-GW 19 (caused by the need to buffer uplink packets while waiting for assignment of the eNodeB 15 downlink TEID).

When the UE 11 moves from one S-GW 19 area to another S-GW area, in the prior art arrangement each dedicated bearer requires a separate message to be sent to the PDN-GW 7 and to the eNB 15. According to the first mechanism, just one message, carrying the TEID-UE can be used to switch the default bearer, along with all its associated dedicated bearers.

In a modification of the first mechanism the GTP-U header includes a new field 36 in addition to the existing 32-bit TEID 34, as shown in FIG. 3. The QoS flow is indicated in the new field 36, and may comprise 6 or 8 bits and may be set to a particular DSCP value, as in the FIG. 2 arrangement. Practically, the splitting of the TEID field in two would be translated in a different interpretation of the TEID field itself by the tunnel endpoints.

The new format of the TEID in FIG. 3 allows to have only one tunnel per UE 11. The tunnel is identified by the first 32 bits of the GTP TEID field (the TEID 34). The last 8 bits of that field (new field 36) identifies the EPS bearer. Only one ID (which will be the first 32 bits, TEID 34) per UE 11 has to be negotiated between the Serving GW 19 and the eNB 15 (or between any two tunnel endpoints). In contrast, in the prior art version of GTP discussed above each bearer had to negotiate a new TEID. In the second mechanism there are as many TEIDs per UE 11 as the number of EPS bearers established by the UE 11 but all these TEIDs will have the first 32 bits in common.

The second mechanism maps the QoS Label (identifying the EPS bearer) to a value consistent with the DSCP Service Classes dictated by IETF in RFC 4594. These values could be copied to the ToS field of the outer IP header (i.e. the one carrying the GTP payload).

In both the first and second mechanisms, the value of the QoS Label should be communicated to the end node (i.e. eNodeB 15 in case of S1 and Serving GW 19 in case of S5/S8a) using the signaling plane during the bearer establishment process. The mechanisms proposed enable the implementation of the one user plane tunnel solution per UE 11 without sacrificing the possibility of having multiple EPS bearers per each UE with different QoS treatments.

FIG. 4 shows schematically the single tunnel 40 for UE 11 for three EPS bearers 42A, 42B and 42C. The TEID of each bearer includes the DSSC of each bearer 42A, 42B and 42C. In the downlink the eNB 15 receives the EPS bearers 42A, 42B and 42C from the single tunnel 40 and transmits the data on respective radio bearers 44A, 44B and 44C.

Using the DSSC (DiffServ Service Classes) as 3GPP EPS QoS Labels simplifies the EPS QoS model. Being defined on an IETF concept, the DSSC is expected to become a universal "service class" identifier ensuring that QoS is enforced across heterogeneous IP-based systems (3GPP, non-3GPP and transport) in consistent manner. This mapping will relieve 3GPP from having to specify yet another set of parameters to differentiate different QoS classes. In addition, QCI (QoS Class Identifiers) specified for GPRS Rel-7 (pre-LTE) should again be mapped to DSSC.

Given this, DSSC (as defined in RFC 4594) could be used to identify an EPS bearer within the UE's GTP-U tunnel identified by the TEID. The same DSSC value could be configured in the outer IP header to enable QoS differentiation in the transport network. This will in turn be reflected in considerable cost savings because of the reduced capacity to be provisioned for such transport networks.

Note that this DSCP needs to be copied from the outer IP header into any additional IPSec encapsulating IP header between the Serving GW 19 and the eNB 15. This procedure must be performed by the Serving GW 19 for the DL (down link) traffic and by the eNodeB 15 for the UL (up link) traffic. The same principles apply on the interface 21 between the PDN GW 7 and the Serving GW 19.

The embodiment described simplifies the currently agreed 3GPP EPS QoS framework by deploying a one user plane mobility tunnel (GTP-U) solution per UE (over S1 and S5/S8a) and re-using the semantic of IP DiffServ Service Classes to characterise the different QoS classes in 3GPP systems.

These enhancements will produce:

a simpler mobility management solution for 3GPP EPS with only one mobility tunnel per UE to manage, decreasing the system complexity and hence resulting in lower equipment cost reduced bearer setup delay resulting in increased responsiveness of service access the ability to enforce QoS over IP DiffServ enabled transport networks

The invention claimed is:

1. A method of transmitting data on a plurality of bearers in a cellular or mobile telecommunications network between first and second network nodes, the plurality of bearers relating to different services for a mobile terminal, the method including:
    establishing a single tunnel between the first and second network nodes of the telecommunications network, the single tunnel having a tunnel identifier;
    creating the plurality of bearers in the single tunnel;
    allocating each bearer a unique identification, with each unique identification having:
        a first component being the tunnel identifier as a component common to each bearer, in order to enable the plurality of bearers transmitting data to and/or from the mobile terminal to share the single tunnel; and
        a second component being identification data usable to identify each bearer, as well as enabling service quality differentiation of data transmitted on the plurality of bearers; and
    transmitting the data on said plurality of bearers in said tunnel.

2. The method of claim 1, wherein the identification data indicates the priority of the data in each bearer.

3. The method of claim 1, wherein the identification data is indicative of a DiffServ Service Class, DSSC, as defined in RFC 4594.

4. The method of claim 3 further including copying the identification data to an outer IP header field without mapping.

5. The method of claim 1, wherein the identification data comprises a part of a tunnel endpoint identifier, TEID, another part of the TEID being the tunnel identifier common to all bearers in said tunnel.

6. The method of claim 1, wherein the identification data is transmitted as a separate field from a tunnel end point identifier, TEID.

7. The method of claim 1, wherein the identification data is transmitted in an outer IP header.

8. The method of claim 1 wherein the single tunnel is established using GPRS Tunneling Protocol, GTP.

9. A cellular or mobile telecommunications network including means for establishing a single tunnel between nodes of the telecommunications network between first and second network nodes, and for transmitting data on a plurality of bearers in said tunnel, the plurality of bearers relating to different services for a single mobile terminal, the network comprising a network element or elements configured to:
    establish a single tunnel between the first and second network nodes of the telecommunications network, the single tunnel having a tunnel identifier;
    create the plurality of bearers in the single tunnel, which is configured to allocate each bearer a unique identification, the unique identification having:
        a first component common to each bearer, being the tunnel identifier, in order to enable the plurality of bearers transmitting data to and/or from the mobile terminal to share the single tunnel; and
        a second component being identification data usable to identify each bearer, as well as to enable service quality differentiation of data transmitted on the plurality of bearers; and
    transmit the data on said plurality of bearers in said single tunnel.

10. The telecommunications network of claim 9, wherein the identification data indicates the priority of the data in each bearer.

11. The telecommunications network of claim 9, wherein the identification data is indicative of the DiffServ Service Class, DSSC, as defined in RFC 4594.

12. The telecommunications network of claim 11, wherein the authentication data is transmitted in an outer IP header.

13. The telecommunications network of claim 11 wherein the network element or elements are further configured to copy the identification data to an outer IP header field without mapping.

14. The telecommunications network of claim 9, wherein the identification data comprises one part of a tunnel endpoint identifier, TEID, another part of the TEID being the tunnel identifier common to all bearers in said tunnel.

15. The telecommunications network of claim 9, wherein the identification data is transmitted as a separate field from a tunnel end point identifier, TEID.

16. The telecommunications network of claim 9 wherein the network element or elements are further configured to establish the single tunnel using GPRS Tunneling Protocol, GTP.

* * * * *